US010564995B2

United States Patent
Tsirkin

(10) Patent No.: US 10,564,995 B2
(45) Date of Patent: Feb. 18, 2020

(54) DYNAMIC CONTROL OF HALT POLLING BASED ON RECEIVING A MONITORING INSTRUCTION EXECUTED BY A GUEST

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 204 days.

(21) Appl. No.: 15/616,611

(22) Filed: Jun. 7, 2017

(65) Prior Publication Data

US 2018/0357089 A1 Dec. 13, 2018

(51) Int. Cl.
*G06F 9/455* (2018.01)
*G06F 11/30* (2006.01)
*G06F 11/34* (2006.01)

(52) U.S. Cl.
CPC ........ *G06F 9/45558* (2013.01); *G06F 11/301* (2013.01); *G06F 11/3442* (2013.01); *G06F 2009/45591* (2013.01)

(58) Field of Classification Search
CPC ............. G06F 9/45558; G06F 11/3442; G06F 11/301; G06F 2009/45591
See application file for complete search history.

(56) References Cited

U.S. PATENT DOCUMENTS

| | | | |
|---|---|---|---|
| 7,356,735 B2 | 4/2008 | Bennett et al. | |
| 8,762,599 B2 | 6/2014 | Espig et al. | |
| 8,826,270 B1 | 9/2014 | Lewis et al. | |
| 9,203,855 B1 | 12/2015 | Mooring et al. | |
| 9,367,345 B1 | 6/2016 | Tsirkin | |
| 9,390,267 B2 | 6/2016 | Mooring et al. | |
| 9,489,223 B2 * | 11/2016 | Tsirkin | G06F 9/4418 |
| 2014/0149979 A1 * | 5/2014 | Tsirkin | G06F 9/4418 718/1 |
| 2015/0339142 A1 * | 11/2015 | Tsirkin | G06F 9/45558 710/267 |
| 2015/0339155 A1 * | 11/2015 | Tsirkin | G06F 9/4837 710/267 |
| 2015/0339480 A1 * | 11/2015 | Lutas | G06F 21/56 726/22 |

(Continued)

OTHER PUBLICATIONS

Handling of Guest-Mode Monitor and Mwait by Gabriel L. Somlo; Feb. 5, 2014 (3 pages).

(Continued)

*Primary Examiner* — Bradley A Teets
*Assistant Examiner* — Michael W Ayers
(74) *Attorney, Agent, or Firm* — K&L Gates LLP

(57) ABSTRACT

A system and method for dynamic halt-polling control includes a memory, one or more physical processors in communication with the memory, and a hypervisor executing on the one or more physical processors. In an example, the hypervisor enables halt-polling and disables monitoring of a guest in a virtual machine. Then, the hypervisor exposes the monitoring to the guest. In an example, the hypervisor detects a monitoring instruction executed on a virtual central processing unit (VCPU) of the virtual machine. The monitoring instruction is executed by the guest, which causes an exit to the hypervisor while the monitoring is disabled. Responsive to detecting the monitoring instruction that causes the exit to the hypervisor, the hypervisor disables the halt-polling and enables the monitoring of the guest.

19 Claims, 6 Drawing Sheets

(56) References Cited

U.S. PATENT DOCUMENTS

2016/0321183 A1* 11/2016 Govindan ........... G06F 12/0862
2018/0004954 A1* 1/2018 Liguori ................ H04L 9/3263

OTHER PUBLICATIONS

Dune: Safe User-level Access to Privileged CPU Features by Belay, et al.; Stanford University (14 pages).

Adding Advanced Storage Controller Functionality via Low-Overhead Virtualization by Ben-Yehuda et al.; Appears in the Proceedings of the 10th USENIX Conference on File and Storage Technologies (FAST ;12), 2012, (8 pages).

* cited by examiner

US 10,564,995 B2

DYNAMIC CONTROL OF HALT POLLING BASED ON RECEIVING A MONITORING INSTRUCTION EXECUTED BY A GUEST

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines, which may increase the hardware utilization rate.

In order to preserve power resources and lower overhead usage, processors may utilize monitoring instructions designating a range of memory that allow the processor to stop instruction execution. The processor executing the monitoring instruction may be blocked from further execution and enter a wait state until there is a change to the designated memory by another processor or an inter-processor interrupt is received. Using the x86 instruction set architecture as an example, monitoring instructions may include a MONITOR instruction and an MWAIT instruction. The MONITOR instruction causes the processor to monitor a range of memory addresses designated by the MONITOR instruction. If there is a change to the designated memory (e.g., data storing), a signal is triggered within the processor hardware. This signal may be used by the MWAIT instruction. The MWAIT instruction causes the processor to enter a halt state until data has been written to a memory address within the range designated by the MONITOR instruction. If a processor is in a halt state as a result of the MWAIT instruction, a change to the designated memory may trigger a signal to bring that processor out of the halt state.

SUMMARY

The present disclosure provides a new and innovative system and methods for dynamic halt-polling control. In an example, a system includes a memory, one or more physical processors in communication with the memory, and a hypervisor executing on the one or more physical processors. In an example, the hypervisor enables halt-polling and disables monitoring of a guest in a virtual machine. Then, the hypervisor exposes the monitoring to the guest. In an example, the hypervisor detects a monitoring instruction executed on a virtual central processing unit (VCPU) of the virtual machine. The monitoring instruction is executed by the guest and the monitoring instruction causes an exit to the hypervisor while the monitoring is disabled. Responsive to detecting the monitoring instruction that causes the exit to the hypervisor, the hypervisor disables the halt-polling and enables the monitoring of the guest.

Additional features and advantages of the disclosed method and apparatus are described in, and will be apparent from, the following Detailed Description and the Figures.

DETAILED DESCRIPTION OF EXAMPLE EMBODIMENTS

Figure 1:
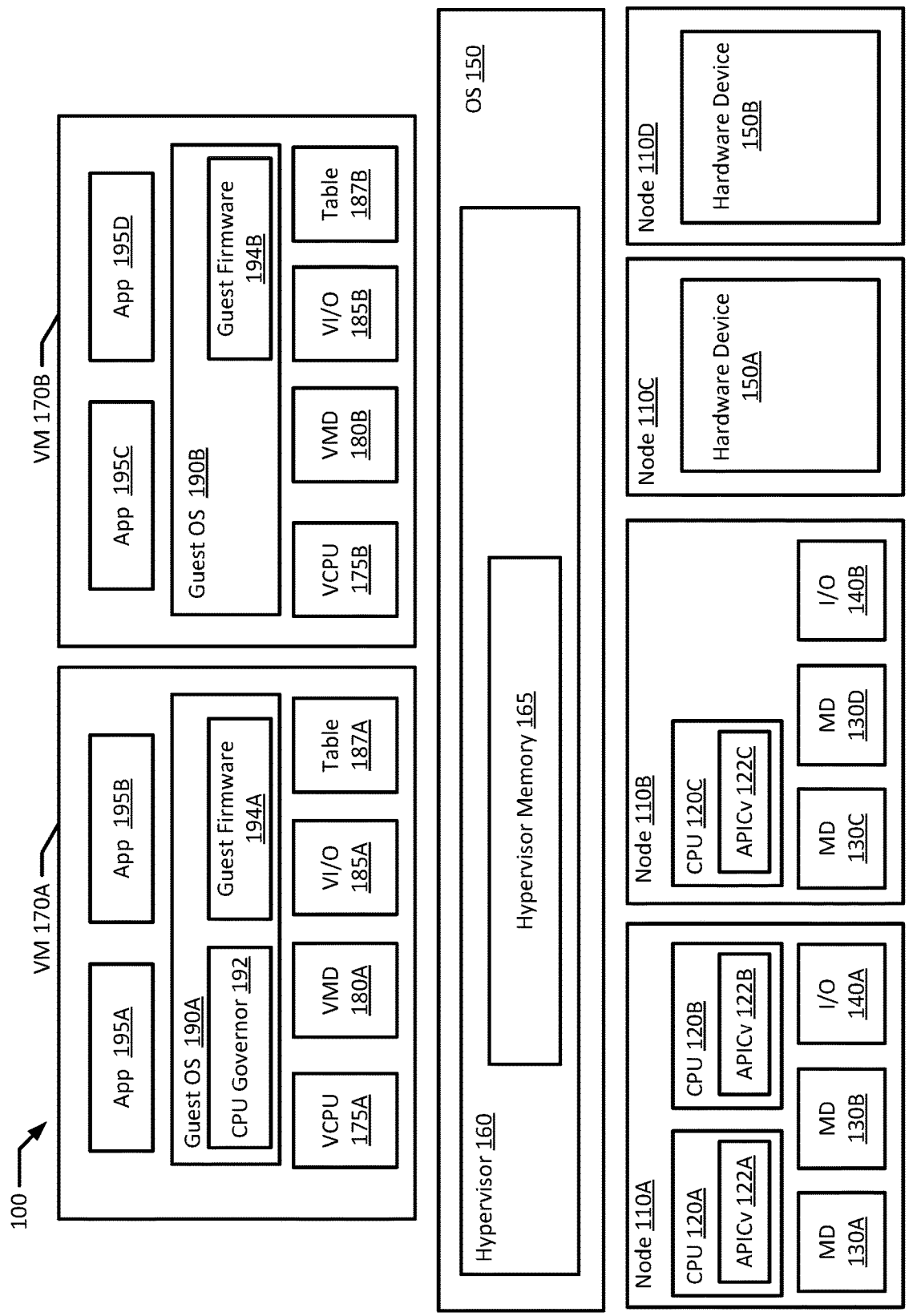
FIG. 1 is a block diagram of an example computer system according to an example of the present disclosure.

Described herein are methods and systems for dynamic halt-polling control. Generally, when a virtual central processing unit (VCPU) of a virtual machine has no tasks to process and is in an idle state, a guest of the virtual machine may send a request to halt the VCPU to the hypervisor, which may cause a virtual machine (VM) exit to the hypervisor. That is, the physical processor on which the guest and VCPU were running may be switched from a guest mode to a hypervisor mode after the guest issues the halt request. Then, the hypervisor may halt the VCPU and run another task (e.g., another VCPU) on the physical processor on which the halted VCPU was running.

When an interrupt arrives for a guest, a hypervisor typically needs to virtualize guest access to interrupts and guest interrupts and this may require a VM exit and/or a VM re-entry, which is one of the major sources of virtualization overhead. Some modern processors support a technique, such as Advanced Programmable Interrupt Controller virtualization (APICv), which enables the system to inject interrupts while staying in the guest mode without triggering a VM exit and/or a VM entry. However, if an interrupt arrives for the halted VCPU while another task is running on the host CPU, this advantage may be lost. That is, if an interrupt arrives for the halted VCPU, the hypervisor may need to stop the other task (e.g., another VCPU), which may cause another VM exit to the hypervisor, and re-enter the guest mode to run the halted VCPU to process the interrupt, which may increase the latency of the system.

One way to reduce the latency of the system may be to use a halt-polling technique. Halt-polling is a hypervisor technique where, when detecting a request to halt a VCPU, a hypervisor may poll the VCPU for a while and wait for an interrupt for the VCPU to arrive instead of halting the VCPU right away. As used herein, polling a VCPU by the hypervisor may refer to a situation where the hypervisor waits for an interrupt to arrive for the given VCPU and refrains from running another task (e.g., another VCPU) on the physical processor on which the given VCPU was running. Sometimes, the hypervisor may switch the host CPU from a hypervisor mode to a guest mode repeatedly as soon as the host CPU exits to the hypervisor due to the issuance of the VCPU halt request. The hypervisor may also include some extra logic attempting to predict when an interrupt will arrive for a given VCPU and, based on the prediction, the hypervisor may determine whether to wait for a new interrupt or halt the VCPU. In this way, halt-polling may increase the chance that a new interrupt will arrive while the virtual machine is running or the hypervisor is polling, reducing the number of VM exits and, thus, may be efficient in reducing latency in an interrupt-driven system.

However, many modern guests support a CPU governor (e.g., a paravirtualized idle CPU governor), which may prevent the guests from sending a request to halt a VCPU to the hypervisor when a new interrupt is expected to arrive soon. In addition, unlike legacy guests (e.g., Red Hat®

Enterprise Linux® 5), some of the more modern guests (e.g., Red Hat® Enterprise Linux® 6) also support monitoring (e.g., MWAIT polling). As used herein, monitoring or MWAIT polling may refer to a situation or a technique where, by executing a monitoring instruction (e.g., MWAIT and/or MONITOR), a guest keeps a host CPU staying in a guest mode while waiting for a new interrupt to arrive, for example, when a new interrupt is expected to arrive soon. Therefore, implementing halt-polling in such system with modern guests may merely increase CPU utilization with having little effect of reducing the latency of the system.

Aspects of the present disclosure may address the above-noted deficiencies. In an example, a hypervisor may boot a guest of a virtual machine. For example, the guest booted by the hypervisor may be a modern guest, but the hypervisor may not know whether it is a legacy guest or a modern guest at the moment the guest was booted. Then, the guest may load a CPU governor, which may prevent the guest from sending a request to halt the VCPU to the hypervisor when a new interrupt is expected to arrive within a target residency time. After the boot of the guest, the hypervisor may enable halt-polling and disable monitoring of the guest of the virtual machine, for example, by clearing a flag (e.g., changing the value of the flag to "0"), assuming that the guest booted is a legacy guest. The system may be configured in a way that execution of a monitoring instruction by a given VCPU when that VCPU's monitoring is disabled (e.g., value of the flag is "0") causes a VM exit.

Then, the hypervisor may expose monitoring to the guest by providing a guest readable memory (e.g., ACPI table) to the guest. When this guest readable memory is provided to modern guests, modern guests may be able to determine that this system supports monitoring and/or when to execute a monitoring instruction by reading the guest readable memory. For example, the guest readable memory may include information indicating that the guest may execute the monitoring instruction when any VCPU of the guest becomes idle and when the guest predicts that a new interrupt is expected to arrive soon (e.g., within a target residency time). Unlike legacy guests, modern guests may be typically configured to read this guest readable memory (e.g., ACPI table) by default, for example, during the boot of the guest. Generally, legacy guests may not support monitoring (e.g., MWAIT polling), or may not read or may not be adapted to read the guest readable memory (e.g., ACPI table). Therefore, legacy guests may not execute the monitoring instruction (e.g., a memory monitoring instruction).

At a later time, the hypervisor may start executing a VCPU of the virtual machine on a host CPU and, at some point, the VCPU may become idle. When the CPU governor detects that the VCPU has entered into an idle state, the CPU governor may predict whether a new interrupt is expected to arrive within a target residency time. If the CPU governor predicts that the new interrupt is expected to arrive within the target residency time, the guest may execute a monitoring instruction on the VCPU. Then, the host CPU may switch from a guest mode to a hypervisor mode to exit to the hypervisor since monitoring is disabled. Then, the hypervisor may detect that the VM exit was caused by the monitoring instruction executed by the guest. The hypervisor may also determine that this guest is a modern guest supporting monitoring. Upon detecting this, the hypervisor may disable halt-polling and enable monitoring, for example, by setting the flag (e.g., changing the value of the flag to "1"). Then, the hypervisor may re-enter the guest mode so that the guest can execute the monitoring instruction on the VCPU again, which may cause the VCPU to enter a memory wait state for a while. This time, the execution of the monitoring instruction may not cause the VM exit because monitoring is enabled.

Once the host CPU is in a halt state as a result of the monitoring instruction, the host CPU may stop executing instructions and wait for an event (e.g., an interrupt or a modification of a designated memory location) to be triggered. A change to the designated memory or a receipt of an interrupt may trigger a signal to bring that host CPU out of the halt state and, then, the host CPU may continue to execute instructions (e.g., instructions received after the monitoring instruction) in a guest mode.

In this way, the hypervisor may be able to determine whether the guest that is booted is a modern guest supporting monitoring by exposing the monitoring to the guest and detecting the monitoring instruction executed by the guest. This may advantageously enable the system to disable halt-polling when it is determined that a given guest is a modern guest supporting monitoring. Since the present disclosure uses the monitoring instruction executed by the guest to determine whether the guest is a modern guest supporting monitoring, the present disclosure may advantageously operate without changing the configuration of the guest (e.g., changing configurations of the guest, by a hypervisor, to enforce the guest to inform the hypervisor whether it is a modern guest supporting the monitoring or not). Also, aspects of the present disclosure may advantageously reduce CPU utilization and, thus, enable efficient overcommit of the host CPUs, where more virtual machines can be executed in a given set of physical processors, increasing virtual machine density. Additional features and advantages of the disclosed method, system, and apparatus are described below.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory (e.g., memory 130A-D) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter or any other component that connects a computer to a computer network), a peripheral component interconnect (PCI) device, storage devices, disk drives, sound or video adaptors, photo/video cameras, printer devices, keyboards, displays, etc.

As used herein, physical processor or processor 120A-C refers to a device capable of executing instructions encoding arithmetic, logical, and/or I/O operations. In one illustrative example, a processor may follow the Von Neumann architectural model and may include an arithmetic logic unit (ALU), a control unit, and a plurality of registers. In a further aspect, a processor may be a single core processor that is typically capable of executing one instruction at a time (or processing a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and, hence, share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data. The memory device 130A-D may be divided into units referred to as pages. A page is a specific amount of contiguous memory that represents the smallest unit in which an operating system allocates for various purposes. A page of memory is a set range of addresses to which data can be stored. The operating system may swap pages from working memory to longer term storage such as a non-volatile storage.

Processors 120A-C may be interconnected using a variety of techniques, ranging from a point-to-point processor interconnect, to a system area network, such as an Ethernet-based network. Local connections within each node, including the connections between a processor 120A-B and a memory device 130A-B and between a processor 120A-B and an I/O device 140A, may be provided by one or more local buses of suitable architecture, for example, peripheral component interconnect (PCI). As used herein, a device of the OS 150, which may be referred to as a host device, may refer to CPU 120A-C, Memory 130A-D, I/O 140A-B, a software device, and/or a hardware device.

In order to preserve power resources and lower overhead usage, processors 120A-C may utilize monitoring instructions designating a range of memory that allow the processor to stop instruction execution. The processor executing the monitoring instruction may be blocked from further execution and enter a wait state until there is a change to the designated memory by another processor or an inter-processor interrupt is received. Using the x86 instruction set architecture as an example, monitoring instructions may include a memory monitoring instruction, such as a MONITOR instruction and an MWAIT instruction. On some processors, the MONITOR instruction and the MWAIT instruction may be included in a single instruction. If a processor is in a halt state as a result of the monitoring instruction, the processor may stop executing instructions and wait for an event to be triggered. In an example, this event may include an interrupt or a modification of a designated memory location. That is, a change to the designated memory or a receipt of an interrupt may trigger a signal to bring that processor out of the halt state. After the event is triggered, the processor may continue to execute instructions (e.g., instructions received after the monitoring instruction) in a guest mode.

The computer system 100 may run multiple virtual machines (e.g., VM 170A-B) by executing a software layer (e.g., hypervisor 160) above the hardware and below the virtual machines, as schematically shown in FIG. 1. The virtual machines (e.g., VM 170A-B) may be an interface to a guest of the virtual machines and may be executing on the hypervisor 160. In an example, the hypervisor 160 may be a component of the host operating system 150 executed by the computer system 100. In another example, the hypervisor 160 may be provided by an application running on the operating system 150, or may run directly on the computer system 100 without an operating system beneath it. The hypervisor 160 may virtualize the physical layer, including processors, memory, and I/O devices, and present this virtualization to virtual machines 170A-B as devices, including virtual processors (e.g., VCPU 175A-B), virtual memory (e.g., VMD 180A-B), and/or virtual I/O devices (e.g., VI/O 185A-B). Processor virtualization may be implemented by the hypervisor 160 scheduling time slots on one or more physical processors 120A-C such that from the guest operating system's perspective, those time slots are scheduled on a virtual processor 175A-B. The hypervisor 160 is provided with some memory referred to as hypervisor memory 165. Hypervisor memory 165 may correspond to physical pages in host memory 130A-D. Thus, a subset of the pages in host memory 130A-D may be specifically allocated for use by the hypervisor 160. The hypervisor 160 can use this memory to perform various tasks related to management of the virtual machines 170A-B.

In an example, a virtual machine 170A-B may execute a respective guest operating system 190A-B, which may utilize the respective underlying VCPU 175A-B, VMD 180A-B, and VI/O devices 185A-B. One or more applications 195A-D may be running on a virtual machine 170A-B under the guest operating system 190A-B. In an example, each virtual machine 170A-B may include a table (e.g., tables 187A-B). In an example, the tables 187A-B may be an advanced configuration and power interface (ACPI) table. In an example, the tables 187A-B may be created by the hypervisor 160 or guest firmware 194A-B. A table 187A-B may be created during a boot of the VM 170A-B. The hypervisor 160 may be configured to perform the halt-polling techniques. In an example, the hypervisor 160 may include an extra-logic attempting to predict when an interrupt will arrive for a given VCPU and, based on the prediction, the hypervisor may determine whether to wait for a new interrupt or halt the VCPU.

In an example, guest operating systems 190A-B may include guest firmware 194A-B. In an example, one or more guest operating systems (e.g., guest OS 190A) may include a prediction module, such as CPU governor 192. The CPU governor 192 may be a driver of the guest OS 190A. The CPU governor 192 may prevent the guest OS 190A or guest firmware 194A from sending a request to halt a VCPU 175A of the guest when an interrupt is expected to arrive within a target residency time. In an example, the CPU governor 192 may include an instruction which, when executed, predicts whether a new interrupt is expected to arrive within the target residency time. In an example, the hypervisor may provide residency time to the guest. The CPU governor 192 may determine the target residency time based on a predetermined heuristic. In an example, the target residency time may be included in a table (e.g., tables 187A-B). In an example, the CPU governor 192 may be loaded when the virtual machine 170A is booted, reset, or restarted, or when a VCPU 175A is added to the system. In another example, the CPU governor 192 may be loaded on demand, at random time instances, or at any other suitable time. In an example, the CPU governor 192 may be a paravirtualized idle CPU governor. In an example, some guest operating systems (e.g., 190B) may not include/load the CPU governor 192.

In an example, each of the CPUs 120A-C may include an advanced programmable interrupt controller virtualization (APICv) module 122A-C. APICv, which may be provided by some Intel processors (e.g., Intel® Xeon® processors), is hardware virtualization of the Advanced Programmable Interrupt Controller (APIC). Generally, a hypervisor virtualizes guest access to interrupts and guest interrupts. However, this typically requires a VM exit and a VM re-entry, which may be a main source of system overhead. The APICv module 122A-C may virtualize guest interrupts and guest access to interrupts in the hardware, not in the hypervisor, and thus, may reduce VM exits and VM re-entries.

Figure 2:
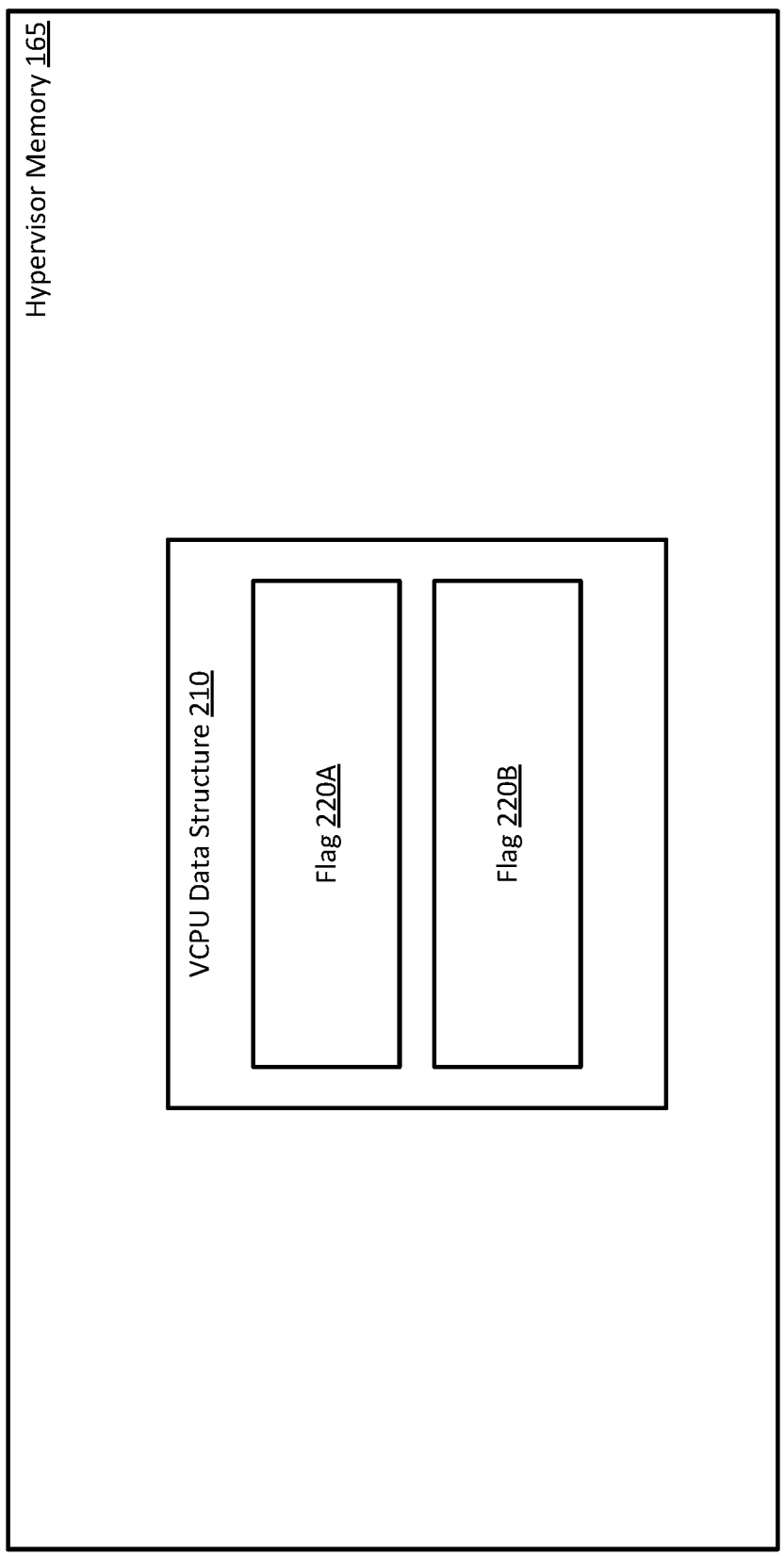
FIG. 2 is a block diagram of an example hypervisor memory according to an example of the present disclosure.

FIG. 2 illustrates an example of hypervisor memory 165. The hypervisor memory 165 may include a VCPU data structure 210, which is a data structure stored in memory (e.g., 130A-D). The VCPU data structure 210 may include information/data about each VCPU (e.g., VCPU 175A-B) or each virtual machine (e.g., VM 170A-B) running in the system. The VCPU data structure 210 may include flags 220A-B. Flags 220A-B may include information about whether a given VCPU's (or a given guest's) halt-polling is disabled or not, and/or whether a given VCPU's (or a given guest's) monitoring is disabled or not. Each of the flags 220A-B may be associated with a specific VCPU (or a specific VM). For example, flag 220A may be associated with VCPU 175A (or VM 170A) and flag 220B may be associated with VCPU 175B (or VM 170B). In this case, flag 220A may include information about whether VCPU 175A's halt-polling is enabled or disabled, and/or whether VCPU 175A's monitoring is disabled or not. Flag 220B may include information about whether VCPU 175B's halt-polling is enabled or disabled and/or whether VCPU 175B's monitoring is disabled or not. In an example, while halt-polling is enabled, the hypervisor 160 may predict whether a new interrupt is expected to arrive within a predetermined amount of time and, based on the prediction, the hypervisor 160 may determine whether to wait for a new interrupt or halt the VCPU.

In an example, flags 220A-B may include a value, such as 0 ("halt-polling enabled" and/or "monitoring disabled") and 1 ("halt-polling disabled" and/or "monitoring enabled"). When a hypervisor 160 sets a flag 220A-B, the value in the flag 220A-B may be changed to 1 ("halt-polling disabled" and/or "monitoring enabled"). When the flag 220A-B is cleared, then the value may be changed to 0 ("halt-polling enabled" and/or "monitoring disabled"). In another example, flags 220A-B may be configured to indicate the state of a given VCPU (e.g., halt-polling enabled/disabled and/or monitoring enabled/disabled) in any other suitable manner. In an example, the default value of the flags 220A-B may be a value (e.g., "0") indicating that halt-polling is enabled and monitoring is disabled.

In an example, each VCPU 175A-B may be associated with at least two flags, one flag including information about whether a given VCPU's halt-polling is disabled and the other including information about whether a given VCPU's monitoring is disabled or not. In another example, each flag 220A-B may include both information about whether a given VCPU's halt-polling is disabled and the whether a given VCPU's monitoring is disabled or not. In this case, for example, a flag value "0" may indicate that halt-polling is enabled and monitoring is disabled, and a flag value "1" may indicate that halt-polling is disabled and monitoring is enabled.

In an example, flags 220A-B may be an MWAIT exiting flag (e.g., MWAIT Exiting flags in some Intel processors). In an example, execution of the monitoring instruction by a given VCPU (or a given guest) when that VCPU's (or that guest's) monitoring is disabled may cause a VM exit, and the host CPU (e.g., CPU 120A-C), on which the VCPU was running, may switch from a guest mode to a hypervisor mode. This MWAIT exiting may be disabled when monitoring is enabled. In an example, in response to a reset, a restart, and/or a boot of the virtual machine (e.g., VM 170A-B), the hypervisor 160 may enable halt-polling and disable monitoring of the guest in the virtual machine. In an example, based on the value in the flag, the system determines whether to exit to the hypervisor when a monitoring instruction is executed by a guest (e.g., "0": exit to the hypervisor; "1": no exit to the hypervisor).

Figure 3:
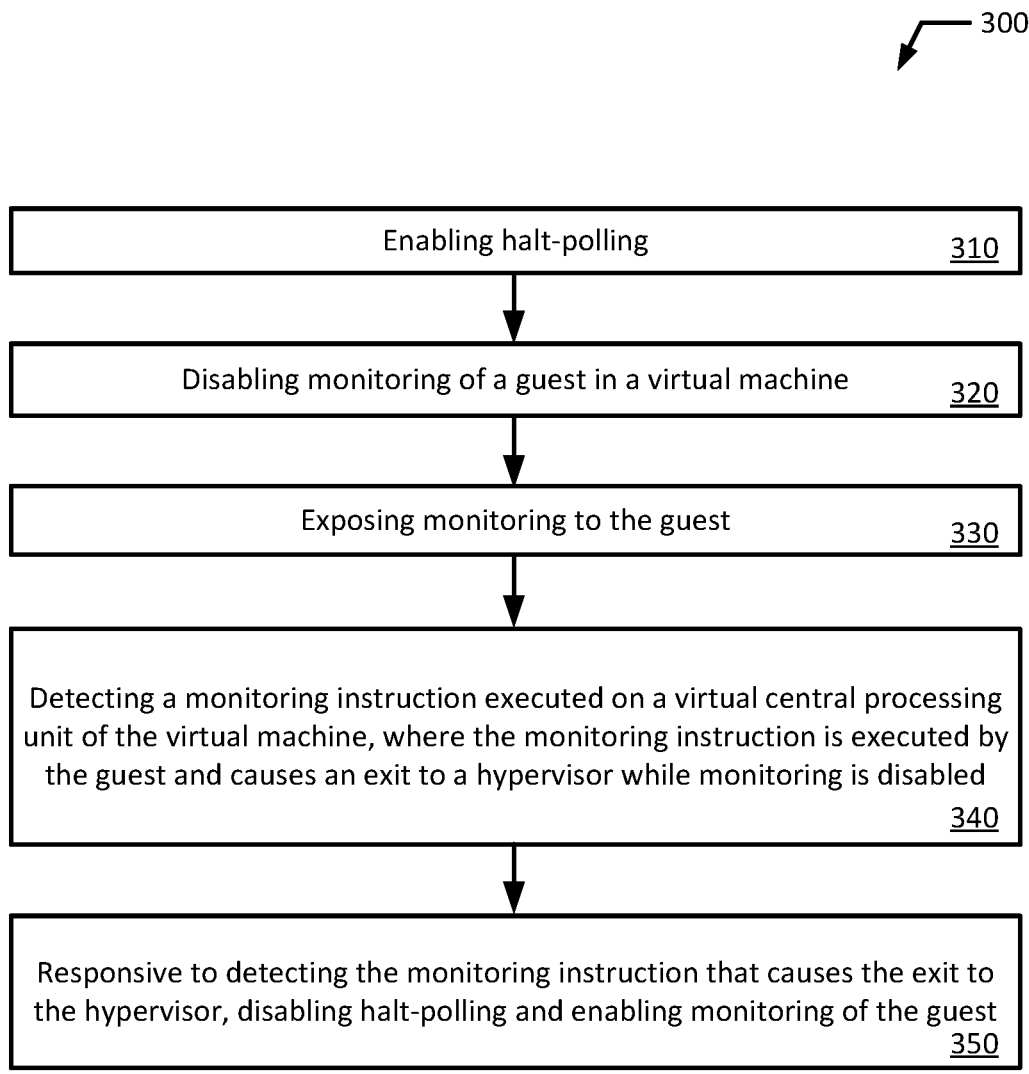
FIG. 3 is a flowchart illustrating an example process for dynamic halt-polling control according to an example of the present disclosure.

FIG. 3 shows a flowchart of an example method 300 for dynamic halt-polling control. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional.

In the illustrated example, a hypervisor executing on one or more physical processors may enable halt-polling (block 310). For example, a hypervisor 160 executing on a physical processor 120A may enable halt-polling. The hypervisor may disable monitoring of a guest in a virtual machine (block 320). For example, the hypervisor 160 may disable monitoring of a guest in VM 170A. As used herein, a guest may refer to any software running within the virtual machines (e.g., VM 170A-B), such as guest operating systems (e.g., guest OS 190A-B) and/or may refer to guest firmware 194A-B running within the virtual machines (e.g., VM 170A-B). In an example, if monitoring of a guest OS 190A in VM 170A is disabled, execution of a monitoring instruction by VCPU 175A may cause a VM exit and the host CPU 120A, on which VCPU 175A was running, may switch from a guest mode to a hypervisor mode. In an example, the hypervisor 160 may enable halt-polling and disable monitoring of a guest in VM 170A by clearing a flag 220A associated with the VCPU 175A.

In an example, the hypervisor may expose monitoring to the guest (block 330). For example, the hypervisor 160 may expose monitoring to the guest of the VM 170A. In an example, the hypervisor may detect a monitoring instruction executed on a VCPU of the virtual machine, where the monitoring instruction is executed by the guest OS and the monitoring instruction causes an exit to the hypervisor while the monitoring is disabled (block 340). For example, the hypervisor 160 may detect a monitoring instruction executed on VCPU 175A of VM 170A, where the monitoring instruction is executed by the guest and the monitoring instruction causes an exit to the hypervisor 160 while monitoring is disabled. In an example, the monitoring instruction may be a memory monitoring instruction (e.g., MONITOR and/or MWAIT).

Responsive to detecting the monitoring instruction that causes the exit to the hypervisor, the hypervisor may disable halt-polling and enable monitoring of the guest (block 350). For example, immediately after detecting the monitoring instruction that causes the exit to the hypervisor 160, the hypervisor 160 may disable halt-polling and enable monitoring of the guest. In an example, the hypervisor 160 may disable halt-polling and enable monitoring of the guest in VM 170A by setting a flag 220A associated with the VCPU 175A.

Figure 4A:
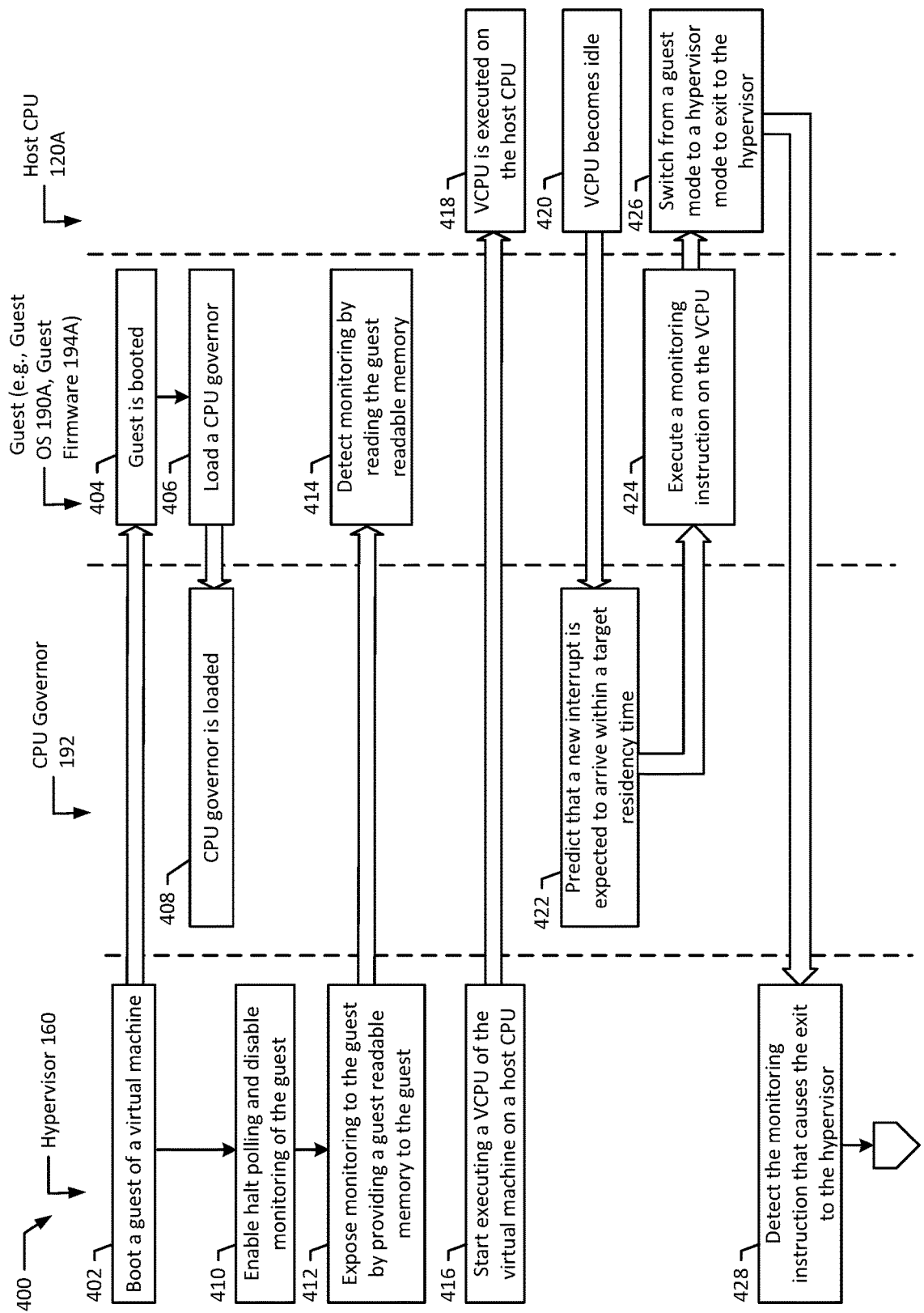
FIGS. 4A and 4B are a flow diagram illustrating an example process for dynamic halt-polling control according to an example of the present disclosure.
Figure 4B:
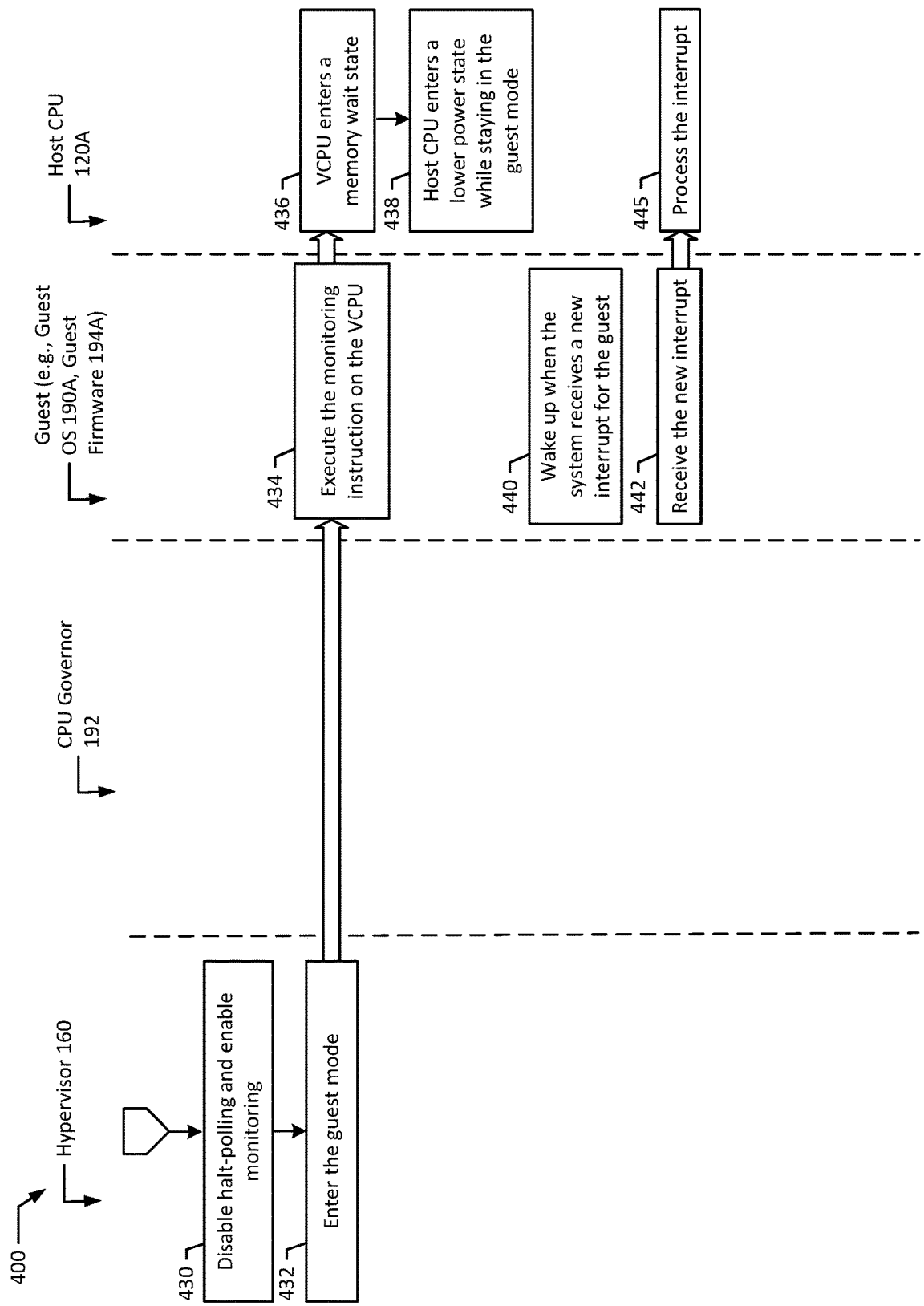

FIGS. 4A and 4B illustrate a flow diagram of an example method 400 for dynamic halt-polling control according to an example of the present disclosure. Although the example method 400 is described with reference to the flow diagram illustrated in FIGS. 4A and 4B, it will be appreciated that many other methods of performing the acts associated with the method may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both. For example, the method 400 may be performed by a system including hypervisor 160, CPU governor 192, a guest (e.g., Guest OS 190A or Guest Firmware 194A), and host CPU 120A communicating or interacting with each other.

In the illustrated example, a hypervisor 160 may boot a guest of a virtual machine 170A (blocks 402 & 404). Then, the guest may load a CPU governor 192 in the virtual machine 170A (blocks 406 & 408). In an example, the guest may load the CPU governor 192 during the boot of the guest. In another example, the guest may load the CPU governor 192 on demand and/or at any other suitable time after booting. In an example, the CPU governor 192 may prevent the guest from sending a request to halt the VCPU to the hypervisor 160 when a new interrupt is expected to arrive within a target residency time (e.g., 1 to 10 μs).

After the boot of the guest, the hypervisor 160 may enable halt-polling and disable monitoring of the guest of the VM 170A (block 410). Then, the hypervisor 160 may expose monitoring to the guest by providing a guest readable memory to the guest (block 412). In an example, the guest readable memory to the guest may be table 187A, which is associated with the guest. In another example, the guest readable memory may be any memory accessible by the guest. Then, the guest may detect monitoring by reading the guest readable memory (block 414). In an example, the guest readable memory may include information indicating that the guest is able to execute a monitoring instruction (e.g., a memory monitoring instruction). In an example, the information may indicate that the guest may execute the monitoring instruction when VCPUs (e.g., VCPU 175A) of the guest become idle and when the guest (e.g., through the CPU governor) predicts that a new interrupt is expected to arrive within a target residency time. In an example, the guest readable memory may further include information indicating that the guest may execute a halt instruction when VCPUs (e.g., VCPU 175A) of the guest become idle and when the guest (e.g., through the CPU governor) predicts that a new interrupt is not expected to arrive within the target residency time. In another example, the information/instruction about when to execute the monitoring instruction and when to execute the halt instruction is stored in the guests (e.g., modern guests) by default such that the hypervisor 160 only needs to inform the guests that the hypervisor 160 supports monitoring by providing the guest readable memory.

At a later time after the CPU governor 192 is loaded, the hypervisor 160 may start executing the VCPU 175A of the virtual machine 170A on a host CPU 120A (blocks 416 & 418). At a later time after the VCPU 175A started executing on the host CPU 120A, the VCPU 175A may become idle (block 420). When the CPU governor 192 detects that the VCPU 175A has entered into an idle state, the CPU governor 192 may predict whether a new interrupt is expected to arrive within a target residency time. If the CPU governor 192 predicts that the new interrupt is expected to arrive within the target residency time (block 422), the guest may execute a monitoring instruction on the VCPU 175A (block 424). Then, the host CPU 120A may switch from a guest mode to a hypervisor mode to exit to the hypervisor (block 426). Then, the hypervisor 160 may detect the monitoring instruction that caused the exit to the hypervisor 160 (block 428). That is, the hypervisor learns that the VM exit was caused by the execution of the monitoring instruction executed by the guest.

Then, the hypervisor 160 may disable halt-polling and enable monitoring (block 430). Then, the hypervisor 160 may enter the guest mode (block 432). For example, the hypervisor 160 may trigger the guest of the VM 170A to restart. Once in guest mode, the guest may execute the monitoring instruction on the VCPU 175A again (block 434), which may cause the VCPU 175A to enter a memory wait state (block 436). This time, the execution of the monitoring instruction may not cause an exit to the hypervisor because monitoring is enabled (and, thus, the MWAIT exiting is disabled). In an example, this may cause the host CPU 120A, on which the VCPU 175A was running, to enter a lower power state while staying in the guest mode. This lower power state may include any suitable power state that may reduce the total power consumed by system, including, but not limited to, a complete halt. In an example, the guest may wake up when the system receives a new interrupt for the guest (block 440). In an example, the new interrupt may be an inter-processor interrupt. In an example, the guest may wake up when there is a change to a designated memory location, which was designated by the monitoring instruction. For example, the guest receives the new interrupt (block 442), and then the host CPU 120A may process the interrupt (block 445).

Before block 442, if the CPU governor 192 predicts that a new interrupt is not expected to arrive within a target residency time, the guest may execute a halt instruction, which may cause a VM exit (e.g., switching from a guest mode to a hypervisor mode) to the hypervisor 160. In an example, the hypervisor 160 may be configured in a way that issuance of a halt instruction by a guest causes an exit to the hypervisor. Then, the hypervisor 160 may detect the halt instruction (e.g., request to stop executing the VCPU 175A).

In an example, upon detecting the halt instruction, the hypervisor 160 may execute another task (e.g., another VCPU 175B) on the host CPU 120A. In an example, upon detecting the halt instruction, the hypervisor 160 may start a timer and execute VCPU 175B on the host CPU 120A until an expiration of the timer. In this case, upon the expiration of the timer, the hypervisor 160 may execute the VCPU 175A on the host CPU 120A again.

In an example, the target residency time may be a few microseconds (e.g., in a range of about 0.5 μs to about 10 μs, preferably in a range of about 1 μs to about 5 μs, more preferably in a range of about 2 μs to about 3 μs). In another example, the target residency may be any other time suitable for the subject host CPU.

Figure 5:
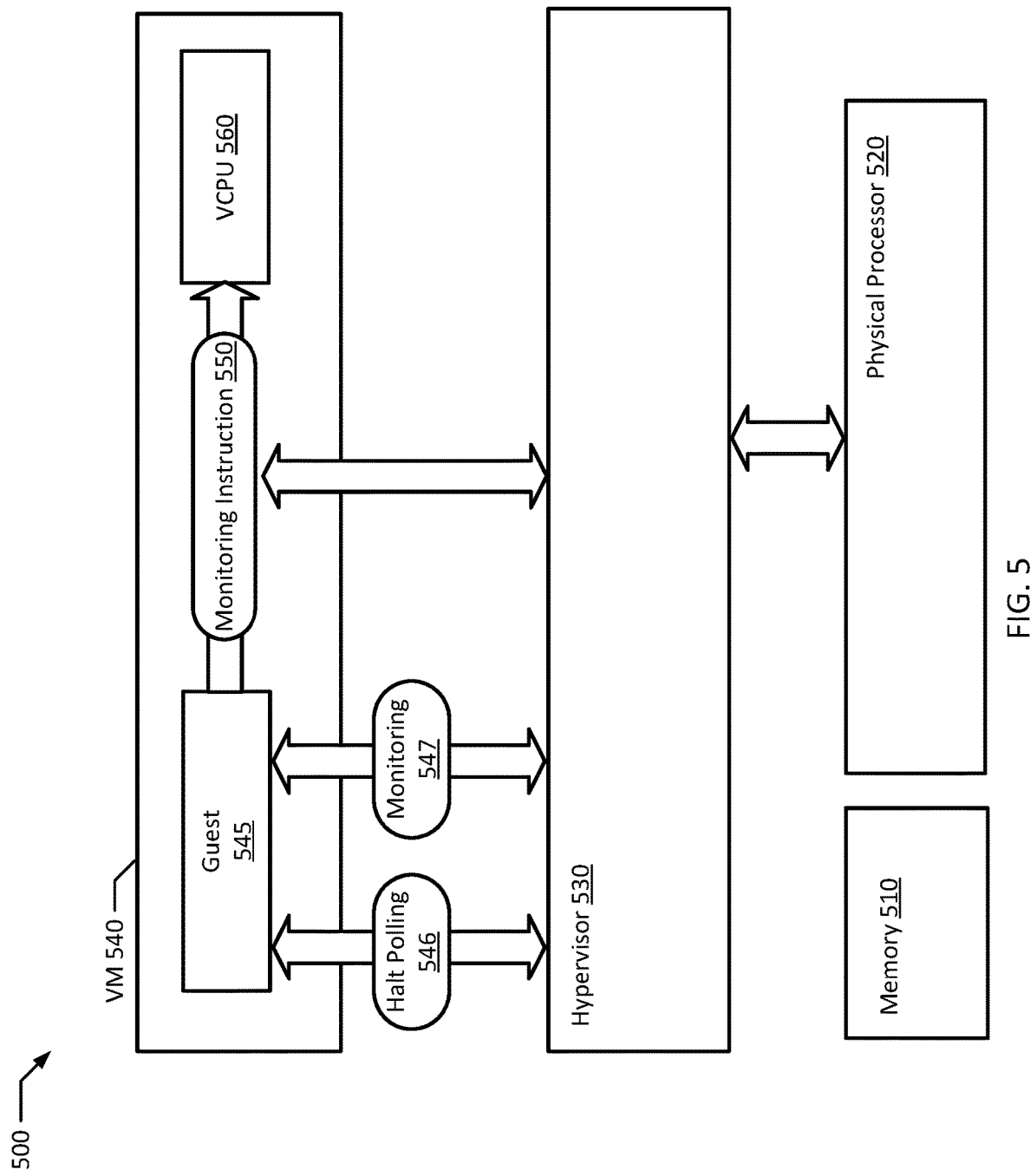
FIG. 5 is a block diagram of an example computer system according to an example of the present disclosure.

FIG. 5 shows a block diagram of an example system according to an example of the present disclosure. As illustrated in FIG. 5, an example system 500 includes a memory 510, a physical processor 520 in communication with the memory 510, and a hypervisor 530 executing on the physical processor 520. In an example, the hypervisor 530 enables halt-polling 546 and disables monitoring 547 of a guest 545 in a virtual machine 540. Then, the hypervisor 530 exposes monitoring 547 to the guest 545. In an example, the hypervisor 530 detects a monitoring instruction 550 executed on a VCPU 560 of the virtual machine 540. The monitoring instruction 550 is executed by the guest 545 and the monitoring instruction 550 causes an exit to the hypervisor 530 while monitoring 547 is disabled. Responsive to detecting the monitoring instruction 550 that causes the exit to the hypervisor 530, the hypervisor 530 disables halt-polling 546 and enables monitoring 547 of the guest 545. Accordingly, the presently disclosed system may perform dynamic halt-polling control by MWAIT emulation by enabling the hypervisor to disable halt-polling 546 when it is determined that a given guest is a modern guest supporting monitoring 547 without changing the configuration of the guest, which may advantageously reduce CPU utilization and enable efficient overcommit of the host CPUs. Additional features and advantages of the disclosed method, system, and apparatus are described below.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which, when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer-readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
one or more physical processors in communication with the memory;
a hypervisor; and
a guest operating system (guest) in a virtual machine that is managed by the hypervisor, the virtual machine having a virtual central processing unit (VCPU) running on the one or more physical processors,
the hypervisor executing on the one or more physical processors to:
enable a halt-polling function executable by the hypervisor, wherein the halt-polling function causes the hypervisor to predict whether a new interrupt is expected to arrive within a predetermined amount of time following the VCPU becoming idle and to poll for the new interrupt while refraining from running another VCPU during the predetermined amount of time;
disable a monitoring function executable by the guest, wherein the monitoring function keeps the one or more physical processors in a guest mode while monitoring the VCPU for the new interrupt to arrive within a target residency time following the VCPU becoming idle, and wherein a monitoring instruction of the monitoring function, when executed by the guest while the monitoring function is disabled, causes the one or more physical processors to exit the guest mode to the hypervisor;
expose the monitoring function to the guest;
detect the monitoring instruction executed by the guest on the VCPU while the one or more physical processors execute in the guest mode, and cause the one or more physical processors to exit the guest mode to the hypervisor; and
responsive to detecting the monitoring instruction that causes the exit to the hypervisor:
disable the halt-polling function; and
enable the monitoring function executable by the guest, wherein the monitoring instruction, when executed by the guest while the monitoring function is enabled, causes the guest to perform the monitoring function.

2. The system of claim 1, wherein the hypervisor exposes the monitoring function to the guest by providing a table to the guest, wherein the table includes information indicating that the guest is enabled to execute the monitoring instruction when the VCPU becomes idle and the guest predicts that the new interrupt is expected to arrive within the target residency time.

3. The system of claim 2, wherein a prediction module in the guest predicts whether the new interrupt is expected to arrive within the target residency time.

4. The system of claim 3, wherein the prediction module is loaded in the guest responsive to at least one of a reset, a restart, and a boot of the virtual machine.

5. The system of claim 3, wherein the prediction module is a CPU governor.

6. The system of claim 2, wherein the table is an advanced configuration and power interface table.

7. The system of claim 1, further comprising a flag in hypervisor memory, wherein the hypervisor disables the monitoring function by setting the flag and enables the monitoring function by clearing the flag.

8. The system of claim 7, wherein the hypervisor enables the halt-polling function by setting the flag and disables the halt-polling function by clearing the flag.

9. The system of claim 1, wherein responsive to at least one of a reset, a restart, and a boot of the virtual machine, the hypervisor enables the halt-polling function and disables the monitoring.

10. The system of claim 1, wherein responsive to disabling the halt-polling function and enabling the monitoring function, the guest executes the monitoring instruction on the VCPU, which causes the VCPU to enter a memory wait state without exiting to the hypervisor.

11. The system of claim 1, wherein the hypervisor provides the target residency time to the guest.

12. The system of claim 2, wherein the target residency time is included within the table.

13. A method comprising:
enabling, by a hypervisor on one or more physical processors in communication with a memory, a halt-polling function executable by the hypervisor, wherein the halt-polling function causes the hypervisor to predict whether a new interrupt is expected to arrive within a predetermined amount of time following a virtual central processing unit (VCPU) running on the one or more physical processors becoming idle and to poll for the new interrupt while refraining from running another VCPU during the predetermined amount of time;

disabling, by the hypervisor, a monitoring function executable by a guest operating system (guest) in a virtual machine that is managed by the hypervisor, the virtual machine having the VCPU, wherein the monitoring function keeps the one or more physical processors in a guest mode while monitoring the VCPU for the new interrupt to arrive within a target residency time following the VCPU becoming idle, and wherein a monitoring instruction of the monitoring function, when executed by the guest while the monitoring function is disabled, causes the one or more physical processors to exit the guest mode to the hypervisor;

exposing, by the hypervisor, the monitoring function to the guest;

detecting, by the hypervisor, the monitoring instruction executed by the guest on the VCPU while the one or more physical processors execute in the guest mode, and causing the one or more physical processors to exit the guest mode to the hypervisor; and responsive to detecting the monitoring instruction that causes the exit to the hypervisor:
  disabling, by the hypervisor, the halt-polling function; and
  enabling, by the hypervisor, the monitoring function executable by the guest, wherein the monitoring instruction, when executed by the guest while the monitoring function is enabled, causes the guest to perform the monitoring function.

14. The method of claim 13, exposing the monitoring function to the guest comprises providing, by the hypervisor, a table to the guest, wherein the table includes information indicating that the guest is enabled to execute the monitoring instruction when the VCPU becomes idle and the guest predicts that the new interrupt is expected to arrive within the target residency time.

15. The method of claim 14, wherein a prediction module in the guest predicts whether the new interrupt is expected to arrive within the target residency time.

16. The method of claim 13, wherein the hypervisor disables the monitoring function by setting a flag and enables the monitoring function by clearing the flag.

17. The method of claim 13, wherein the hypervisor enables the halt-polling function and disables the monitoring function responsive to at least one of a reset, a restart, and a boot of the virtual machine.

18. The method of claim 13, further comprising responsive to disabling the halt-polling function and enabling the monitoring function, executing, by the guest, the monitoring instruction on the VCPU, which causes the VCPU to enter a memory wait state without exiting to the hypervisor.

19. A non-transitory machine readable medium storing instructions, which when executed by one or more physical processors, cause the one or more physical processors to:

enable, by a hypervisor on the one or more physical processors, a halt-polling function executable by the hypervisor, wherein the halt-polling function causes the hypervisor to predict whether a new interrupt is expected to arrive within a predetermined amount of time following a virtual central processing unit (VCPU) running on the one or more physical processors becoming idle and to poll for the new interrupt while refraining from running another VCPU during the predetermined amount of time;

disable, by the hypervisor, a monitoring function executable by a guest operating system (guest) in a virtual machine that is managed by the hypervisor, the virtual machine having the VCPU, wherein the monitoring function keeps the one or more physical processors in a guest mode while monitoring the VCPU for the new interrupt to arrive within a target residency time following the VCPU becoming idle, and wherein a monitoring instruction of the monitoring function, when executed by the guest while the monitoring function is disabled, causes the one or more physical processors to exit the guest mode to the hypervisor;

expose, by the hypervisor, the monitoring function to the guest;

detect, by the hypervisor, the monitoring instruction executed by the guest on the VCPU while the one or more physical processors execute in the guest mode, and cause the one or more physical processors to exit the guest mode to the hypervisor; and responsive to detecting the monitoring instruction that causes the exit to the hypervisor:
  disable, by the hypervisor, the halt-polling function; and
  enable, by the hypervisor, the monitoring function executable by the guest, wherein the monitoring instruction, when executed by the guest while the monitoring function is enabled, causes the guest to perform the monitoring function.

* * * * *